United States Patent [19]

Akita et al.

[11] Patent Number: 5,446,541
[45] Date of Patent: Aug. 29, 1995

[54] ELEMENTS ALIGNING/COUPLING APPARATUS AND METHOD

[75] Inventors: Osamu Akita; Michio Suzuki, both of Kanagawa, Japan

[73] Assignee: Sumitomo Electric Industries, Ltd., Osaka, Japan

[21] Appl. No.: 925,925

[22] Filed: Aug. 10, 1992

[30] Foreign Application Priority Data

| Aug. 14, 1991 | [JP] | Japan | 3-204297 |
| Aug. 14, 1991 | [JP] | Japan | 3-204298 |
| Aug. 14, 1991 | [JP] | Japan | 3-204299 |
| Aug. 14, 1991 | [JP] | Japan | 3-204300 |
| Feb. 17, 1992 | [JP] | Japan | 4-029354 |
| Feb. 17, 1992 | [JP] | Japan | 4-029355 |
| Jun. 5, 1992 | [JP] | Japan | 4-145242 |

[51] Int. Cl.$^6$ .................................. G01B 11/00
[52] U.S. Cl. ........................... 356/399; 356/400
[58] Field of Search .................. 356/399–401, 356/138, 153; 385/93

[56] References Cited

U.S. PATENT DOCUMENTS

| 4,772,123 | 9/1988 | Radner | 356/400 |
| 4,930,858 | 6/1990 | Veenendaal | 385/34 |
| 4,999,669 | 3/1991 | Sakamoto et al. | 356/400 X |

FOREIGN PATENT DOCUMENTS

| 0150682 | 8/1985 | European Pat. Off. |
| 0441403 | 8/1991 | European Pat. Off. |
| 55-022710 | 2/1980 | Japan |

Primary Examiner—Richard A. Rosenberger
Assistant Examiner—K. P. Hantis
Attorney, Agent, or Firm—Cushman Darby & Cushman

[57] ABSTRACT

In order to provide an elements aligning/coupling apparatus which can more efficiently align and couple an optical element with a coupling part by providing a reliable close contact of them, an elements aligning/coupling apparatus according to the present invention in which a coupling part is brought into close contact with an optical element held by an element holder, in which the element holder is resiliently supported by a holder by means of resilient members radially extending from the outer circumference of the element holder. Even in such a situation where those elements are coupled in a state of poor parallelism between their coupling end faces, when those elements are made to press contact with each other, the optical element is tilted against the coupling end face of the coupling part. Accordingly, the resultant coupled component has no gap between the coupling end faces of them.

8 Claims, 18 Drawing Sheets

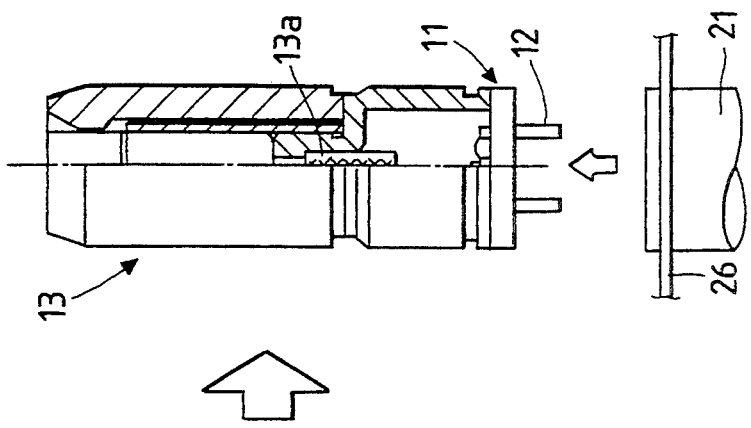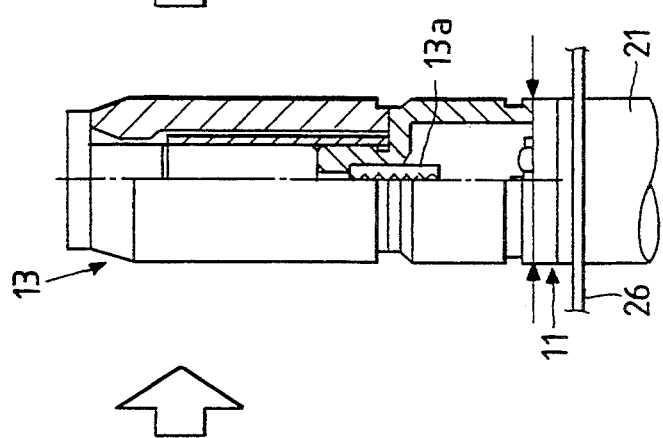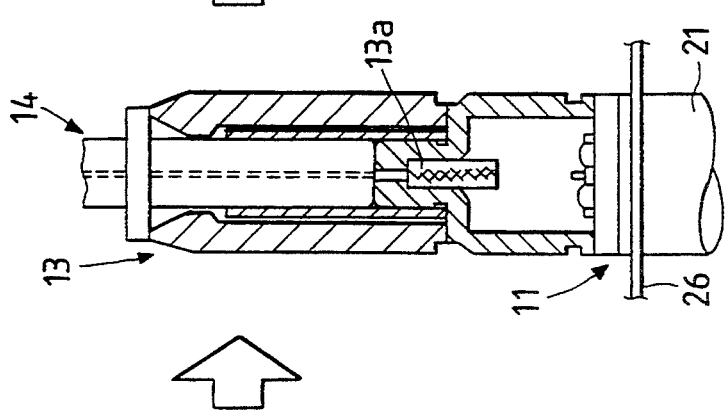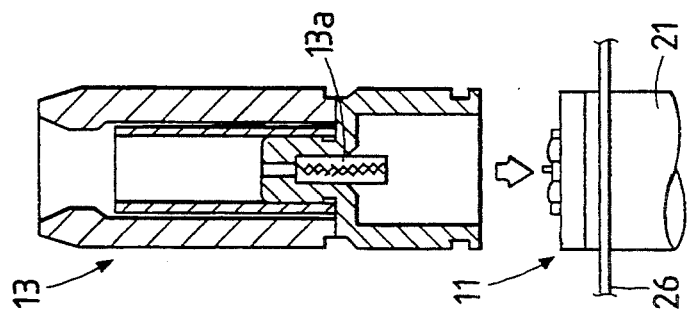

ELEMENTS ALIGNING/COUPLING APPARATUS AND METHOD

BACKGROUND OF THE INVENTION

Field of the Invention

The present invention relates to an elements aligning-/coupling apparatus and method for aligning and coupling a coupling part including a lens, for example, with a light receiving element, a light emitting element, or the like used in the optical communication.

Discussion of the Prior Art

A conventional elements aligning/coupling apparatus is illustrated in FIGS. 33 and 34.

As shown in FIGS. 33 and 34, a light receiving or emitting element (referred to simply as an optical element) 11 is located on an element holder 101. The element holder 101 is mounted on an apparatus body 103 with legs 102. The apparatus body 103 is supported by an X-stage 104 and a Y-stage 105. The X-stage 104 is movable in an X-direction, while the Y-stage 105 is movable in a Y-direction orthogonal to the X-direction. A lead pin 12 of the optical element 11 is inserted into a socket 106 mounted on the lower side of the apparatus body 103.

An optical fiber 14 is connected to a coupling part 13 that is placed facing the optical element 11, and is supported by a support arm 107. The support arm 107 is mounted on a Z-stage 108, which is movable in a Z-direction orthogonal to the X- and Y-directions.

To start the aligning work of the optical element 11 with coupling part 13, the Z-stage 108 moves the coupling part 13 in the Z-direction with respect to the optical element 11 firmly supported, so that the coupling end face of the coupling part comes in close contact with the coupling end face of the optical element 11. Under this condition, the optical element 11 is moved in the X- and Y-directions by the X-stage 104 and the Y-stage 105.

FIG. 35 is a plan view showing another conventional elements aligning/coupling apparatus. FIGS. 36 and 37 are cross sectional views of key portions of the apparatus.

As shown in FIGS. 35 through 37, the elements aligning/coupling apparatus pushes down a coupling part that is held by a chuck against an optical element firmly supported, whereby the coupling end faces of the coupling part comes in close contact with the coupling end face of the optical element.

A holder 111, vertically movable, has a support hole 112 in the central portion thereof. A float 113 is vertically movably placed within the support hole 112. Three hooks 114, equidistantly disposed as viewed in the circumferential direction, are radially movably supported on the float 113. A pin 116 of each hook 114 interlocks with each cam groove 115 of the float 113. Three support pins 117 are planted in the float 113. Each support pin 117 are inserted into each support hole 119 of a bracket 118 secured to the holder 111. A coiled spring 120 intervenes between the support pins 117 and the support hole 119. Reference numeral 121 designates a stopper for stopping the movement of the float 113, and numeral 122 indicates a spring-contained pin for removing a play of the hook 114 that is caused by presence of a gap.

The float 113 is provided with a chuck handle 123, while the holder 111 is provided with a lock handle 124 for locking the chuck handle 123.

To hold a coupling part 125, the hooks 114 move outwardly, and then the coupling part 125 is placed at the central portion of the float 113. Then, the float 113 is turned counterclockwise (as viewed in FIG. 35) by the chuck handle 123. With the cam groove 115, the hooks 114 are moved inwardly to hold the coupling part 125 with the fore ends of the hooks. Under this condition, the chuck handle 123 is locked by the lock handle 124. Then, the holder 111 is moved downwardly while the coupling part 125 is held, so that the coupling end face of the coupling part is brought into close contact with the coupling end face of the optical element (not shown).

In the conventional elements aligning/coupling apparatuses as stated above, the coupling end face of the coupling part is brought into close contact with the coupling end face of the optical element in a manner that the coupling part is axially moved toward the optical element firmly supported. The parallelism between the coupling end faces of the optical element and the coupling part depends on how the optical element is supported and hew the coupling part is held. When the parallelism between them is lost, the optical element 11 is tilted with respect to the coupling part 13, to produce a gap S between the coupling end faces thereof, as shown in FIG. 38. The element 11 and the part 13 thus coupled having the gap S therebetween are fixedly connected by welding, and then is subjected to a resin mold forming process. In the forming process, the gap S is filled with resin. The resultant coupled component exhibits an abnormal coupling performance.

In a case that the optical element 11 is, for example, a light emitting diode (LED) with the lead pin that is bent in its manufacturing stage, when the LED is brought into close contact with the coupling part, a gap S is produced between the coupling end faces thereof both facing each other, as in the above case. As seen also from FIG. 39 of a histogram, the coupled components had relatively large gaps, and its average value was 30.7 μm.

The parallelism (gap) between the coupling end faces being in close contact with each other is an essential matter in gaining a required part accuracy- One of the possible approaches to gain the desired parallelism is to adjust an inclination angle of the coupling part with respect to the optical element when they are coupled. However, this approach requires a complicated construction, which leads to increase of cost to manufacture. The inclination angle adjustment is time- consuming. As a result, the production efficiency is decreased. The bent-lead problem of the LEDs may be solved by straightening the bent lead pins before its aligning work. However, the straightening work also takes much time and is troublesome.

SUMMARY OF THE INVENTION

Accordingly, the present invention has been made in view of the above circumstances and has an object to provide an elements aligning/coupling apparatus which can more efficiently align and couple an optical element with a coupling part by providing a reliable, close contact of them.

According to a first aspect of the present invention, there is provided an elements aligning/coupling apparatus of the type in which a coupling part is brought into close contact with an optical element held by an element holder, in which a plate-like resilient member is disposed around the element holder, a plurality of first coupling parts of the resilient member are secured to the element holder and a plurality of second coupling parts of the resilient member are secured to the apparatus body.

In the elements aligning/coupling apparatus, the resilient member is a disk spring, the disk spring is fastened to the element holder at two points thereof that lie on a circle coaxial with the disk spring and on a first line that radially extends, and further to the apparatus body at two points thereof that lie on a circle coaxial with the disk spring and on a second line that radially extends.

Also in the elements aligning/coupling apparatus, slits are formed in the disk spring in such a fashion that each slit radially extending is located between the fixing points.

Alternatively, slits are formed in the disk spring in such a fashion that each slit is located between the fixing points, and each slit extends from the outer side of the spring toward the inner side thereof, and the inner side of each slit extends along the inner circumference thereof.

According to a second aspect of the present invention, there is provided an elements aligning/coupling apparatus, in which the resilient member is a disk spring, three first fixing points are formed at such positions of the disk spring that are substantially equidistantly separated as viewed in the circumferential direction and lie on a circle coaxial with the disk spring, and three second fixing points are formed at such positions of the disk spring that are substantially equidistantly separated as viewed in the circumferential direction and lie on a circle coaxial with the disk spring, the second fixing points each being located between the adjacent two first fixing points.

Even in such a situation where those elements are coupled in a state of poor parallelism between their coupling end faces, when those elements are made to press contact with each other, the optical element is tilted against the coupling end face of the coupling part, because the optical element mounted on the element holder is resiliently supported by the resilient member provide between the holder and the apparatus body. Accordingly, the resultant coupled component has no gap between the coupling end faces of them.

In the elements aligning/coupling apparatus, the resilient member is a disk spring. The disk spring is fastened to the element holder at two points thereof that lie on the first line, and further to the apparatus body at two points thereof that lie on the second line. Sleeves are formed in the disk spring in such a fashion that each sleeve radially extending is located between the fixing points, and the inner side of each sleeve extends along the inner circumference thereof. The disk spring, when receiving an external force, is deformed with short distance from the fulcrum. Therefore, it can be deformed with weak force applied thereto. The optical element is flexibly tiltable against the coupling part. Three first fixing points are formed at locations of the disk spring substantially equidistantly separated, and three second fixing points are formed at locations of the disk spring substantially equidistantly separated, the second fixing points each being located between the adjacent two first fixing points.

According to a third aspect of the invention, there is provided an elements aligning/coupling apparatus of the type in which a coupling part is brought into close contact with an optical element held by an element holder, in which the coupling end face of the element holder is tiltably and resiliently supported by means of plate springs radially extending from the outer circumference of the element holder.

With the above arrangement, even in such a situation where those elements are coupled in a state of poor parallelism between their coupling end faces, when those elements are made to press contact with each other, the optical element mounted on the element holder is tilted against the coupling end face of the coupling part, with the aid of the radially extending plate springs. Accordingly, the resultant coupled component has no gap between the coupling end faces of them.

According to a fourth aspect of the present invention, there is provided an elements aligning/coupling apparatus of the type in which a coupling part is brought into close contact with an optical element held by an element holder, in which the coupling end face of the element holder is tiltably and resiliently supported by means of bar-like members radially extending from the outer circumference of the element holder.

With the above arrangement, even in such a situation where those elements are coupled in a state of poor parallelism between their coupling end faces, when those elements are made to press contact with each other, the optical element mounted on the element holder is tilted against the coupling end face of the coupling part, with the aid of the radially extending bar-like members. Accordingly, the resultant coupled component has no gap between the coupling end faces of them.

BRIEF DESCRIPTION OF THE DRAWINGS

The accompanying drawings, which are incorporated in and constitute a part of this specification illustrate, embodiments of the invention and, together with the description, serve to explain the objects, advantages and principles of the invention. In the drawings.

FIGS. 9(a) through 9(d) are partial, cross sectional views showing a sequence of steps of aligning and coupling an optical element with a coupling part;

DETAILED DESCRIPTION OF THE PREFERRED EMBODIMENTS

Figure 1:
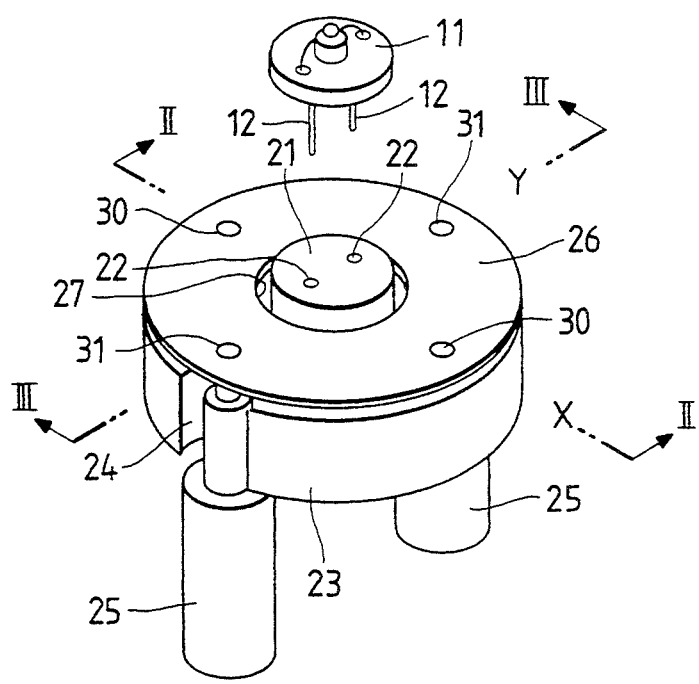
FIG. 1 is a perspective view showing an element holder used in an elements aligning/coupling apparatus according to a first embodiment of the present invention.

Detailed description of the preferred embodiments of the present invention will be described with reference to the accompanying drawings. Throughout the drawings, like reference numerals and characters will be used for designating like or equivalent portions, for simplicity and clarity.

An elements aligning/coupling apparatus according to a first embodiment of the present invention will be described with reference to FIGS. 1 through 11.

Figure 2:
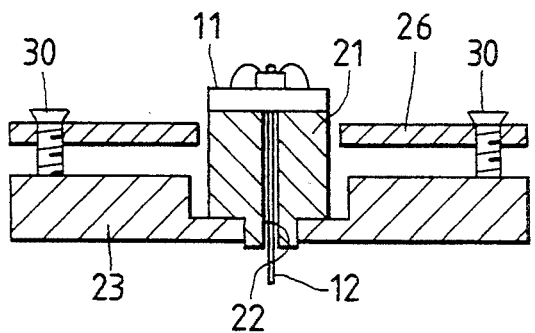
FIG. 2 is a cross sectional view taken on line II—II in FIG. 1.
Figure 3:
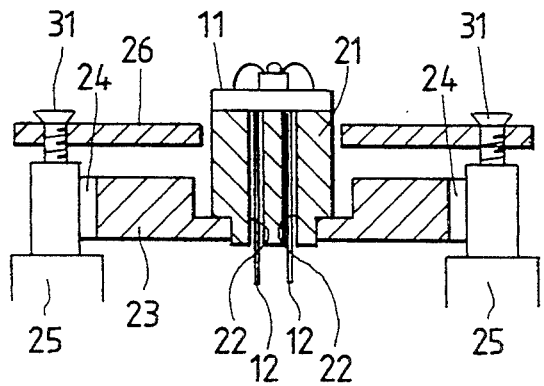
FIG. 3 is a cross sectional view taken on line III—III in FIG. 1.
Figure 5:
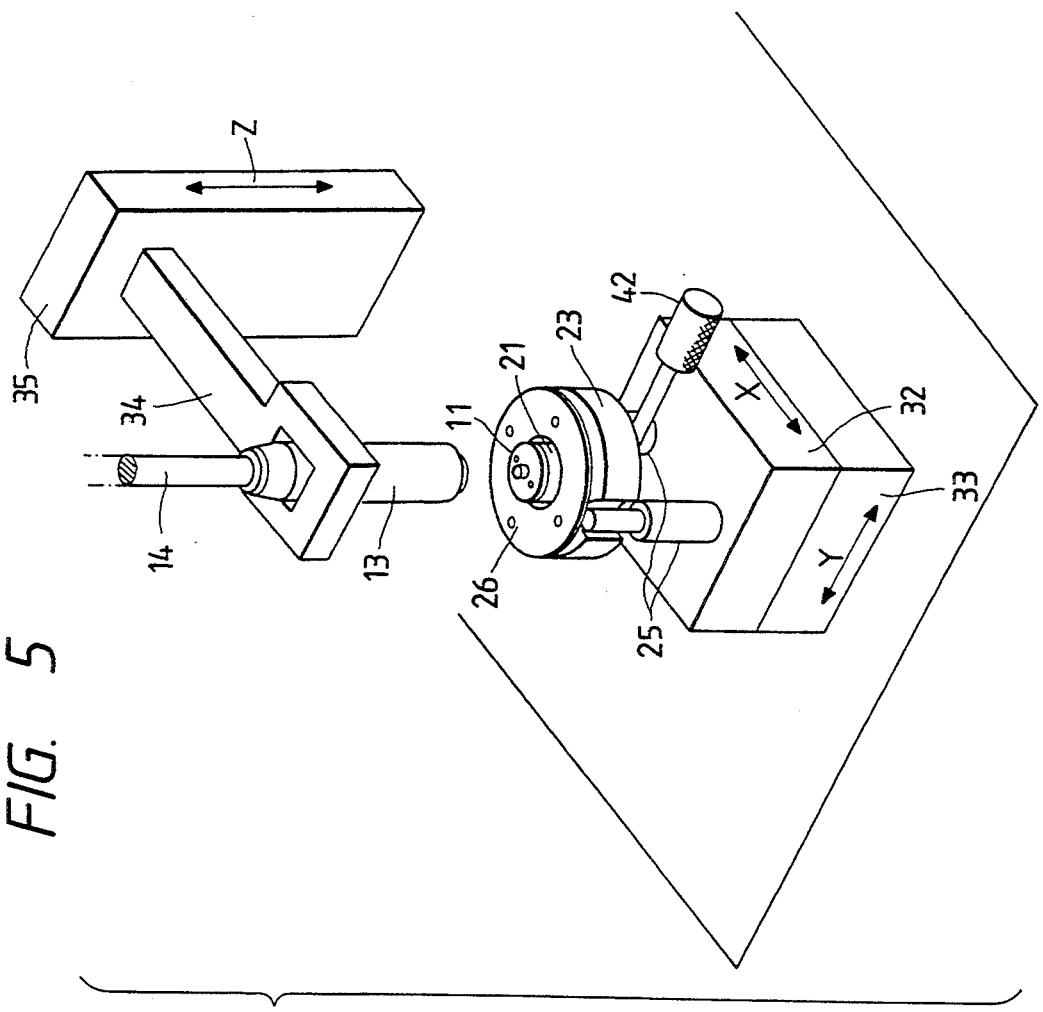
FIG. 5 is a perspective view showing an elements aligning/coupling apparatus according to the first embodiment of the present invention.
Figure 4A:
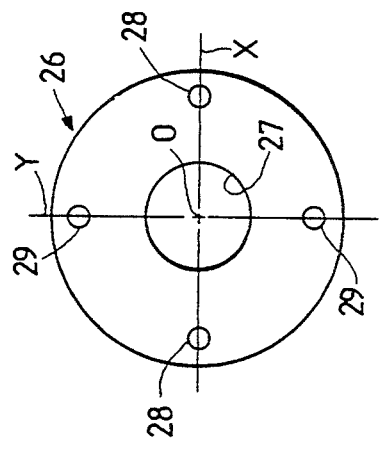
FIG. 4(a) is a plan view showing a disk spring coupled with the element holder of FIG. 1.
Figure 4B:
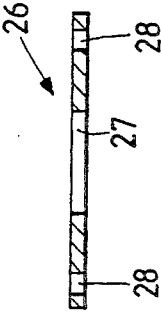
FIG. 4(b) is a cross sectional view showing the disk spring of FIG. 4(a)
Figure 6:
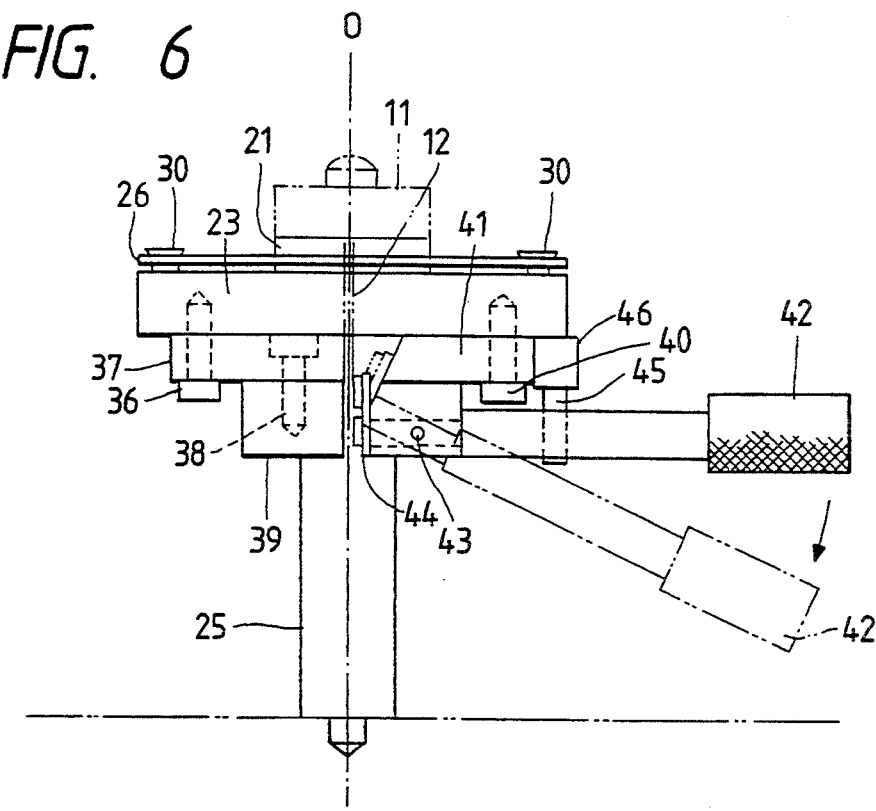
FIG. 6 is a front view showing the elements aligning/coupling apparatus.
Figure 7:
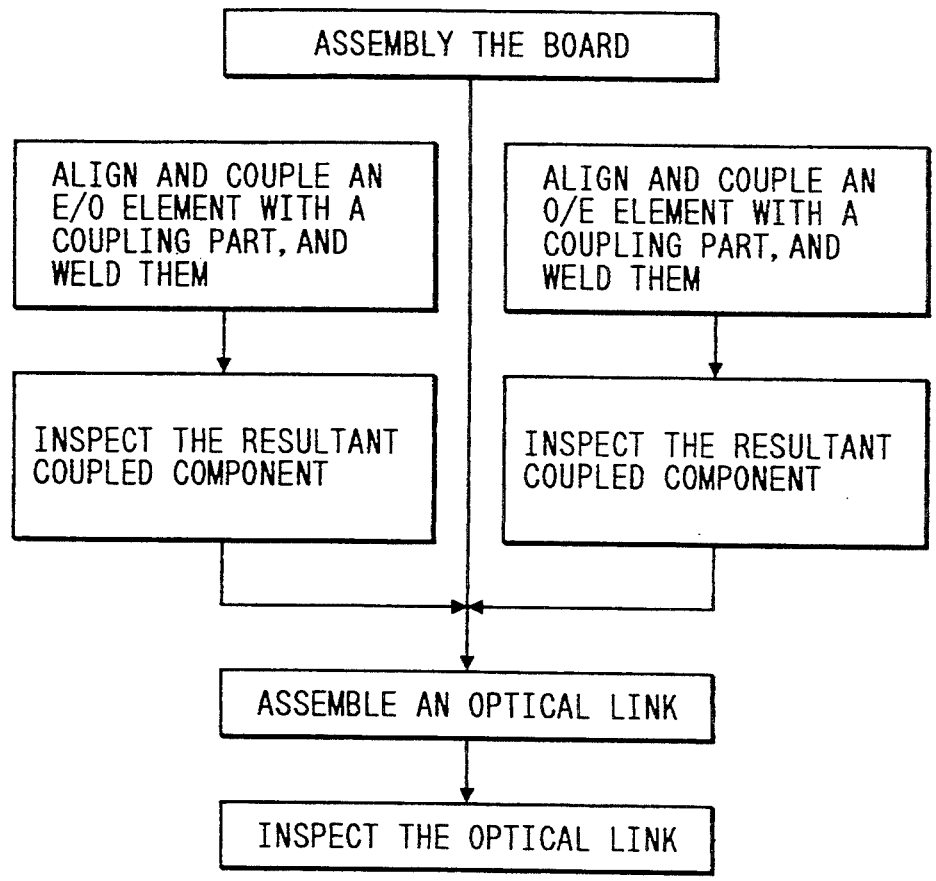
FIG. 7 is a flowchart showing sequences of procedural steps to manufacture the optical link which was light emitting and receiving elements.
Figure 8A:
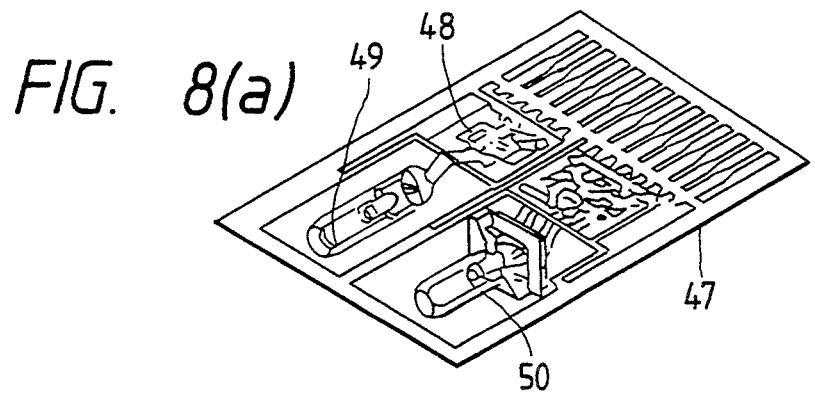
FIGS. 8(a) through 8(c) are perspective views showing sequential steps of manufacturing the optical link which uses light emitting and receiving elements.
Figure 8B:
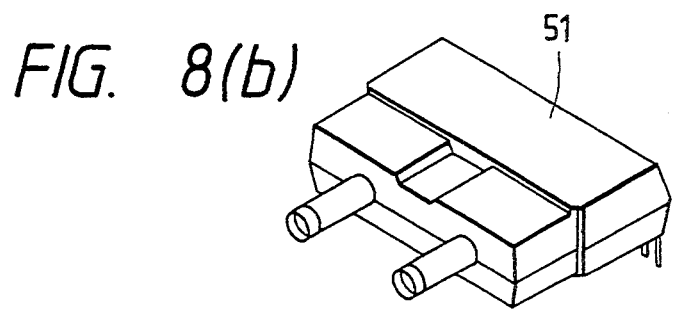
Figure 8C:
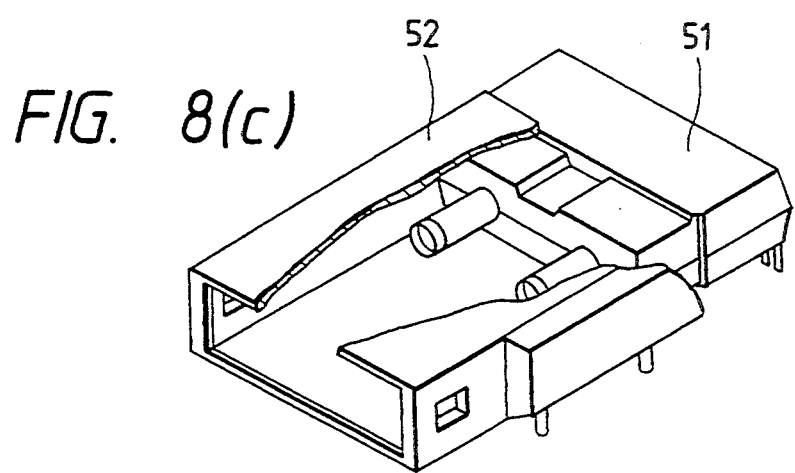
Figure 10:
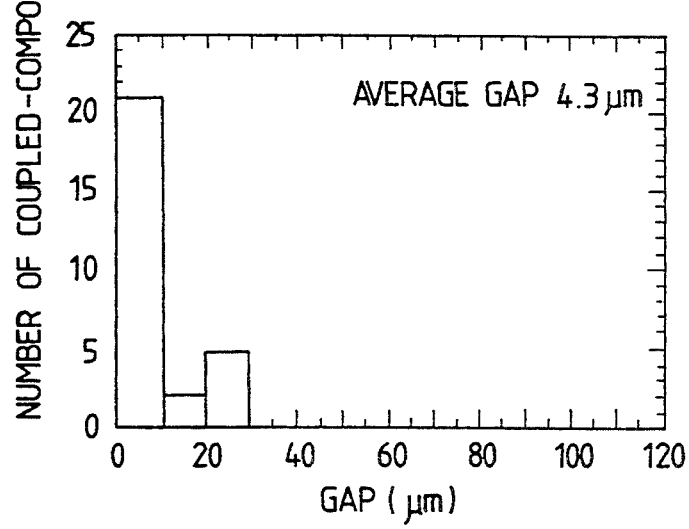
FIG. 10 is a graph showing a histogram in which the relationship between the number of element-part coupled components and their gaps are plotted.
Figure 11:
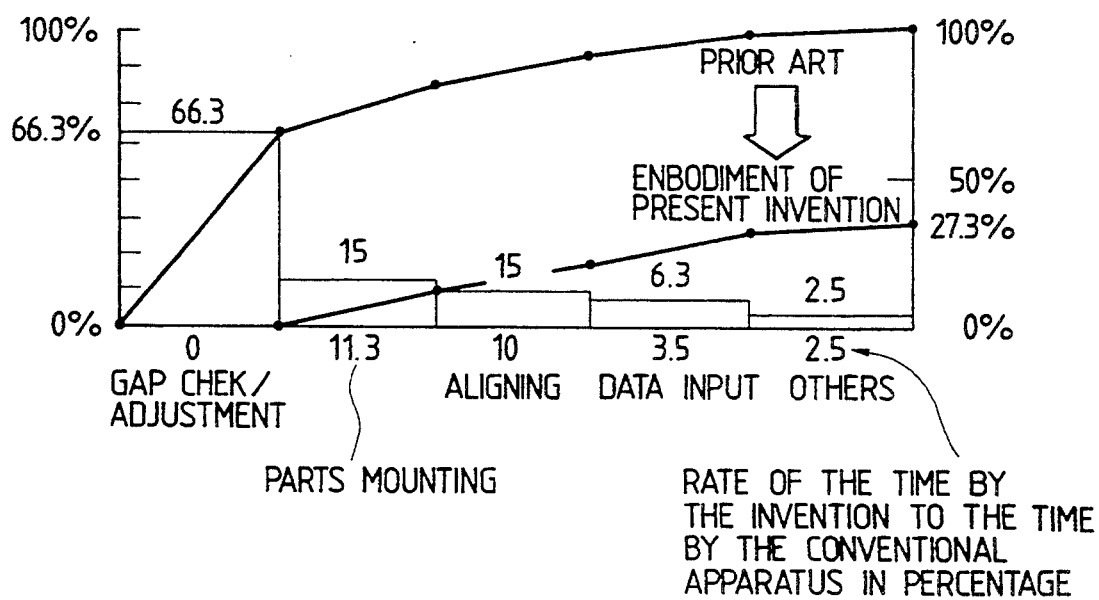
FIG. 11 is a graph showing variations of the times taken for the aligning and coupling work with respective to the respective pieces of that work.

FIG. 1 is a perspective view showing an element holder used in an elements aligning/coupling apparatus according to a first embodiment of the present invention. FIG. 2 is a cross sectional view taken on line II—II in FIG. 1. FIG. 3 is a cross sectional view taken on line III—III in FIG. 1. FIG. 4(a) is a plan view showing a disk spring coupled with the element holder of FIG. 1. FIG. 4(b) is a cross sectional view showing the disk spring of FIG. 4(a). FIG. 5 is a perspective view showing an elements aligning/coupling apparatus according to the first embodiment of the present invention. FIG. 6 is a front view showing the elements aligning/coupling apparatus. FIG. 7 is a flowchart showing sequences of procedural steps to manufacture light emitting and receiving elements. FIGS. 8(a) through 8(c) are perspective views showing sequential steps of manufacturing light emitting and receiving elements. FIGS. 9(a) through 9(d) are partial, cross sectional views showing a sequence of steps of aligning and coupling an optical element with a coupling part. FIG. 10 is a graph showing a histogram in which the number of element-part coupled components (where optical element are aligned and coupled with coupling parts) vs. gaps produced therein are plotted. FIG. 11 is a graph showing variations of the times of the aligning and coupling work with respective to the respective pieces of the work.

In the elements aligning/coupling apparatus of the first embodiment, as shown in FIGS. 1 through 3, an element holder 21, cylindrical in shape, has two through-holes 22 into which lead pins 12 of an optical element 11 are inserted. Accordingly, the optical element 11 can be mounted on the top of the element holder 21. The element holder 21 is fastened at the bottom to the central portion of a disk-like holder 23. Cut-out portions 24, disposed radially opposed to each other, are formed in the circumferential outer side of the holder 23. A disk spring 26, which intervenes between the element holder 21 and support poles 25 and 25, resiliently supports the element holder 21 against the support poles 25.

As shown in FIGS. 4(a) and 4(b), the disk spring 26 has a hole 27 in the central part thereof. A pair of mounting holes 28, formed also in the disk spring 26, are disposed on a first X line extending radially and including the center 0 and symmetrically with respect to the center 0. Another pair of mounting holes 29 are also formed therein being disposed on a second Y line, which extends radially, includes the center 0, and substantially orthogonal to the first X line, and are symmetrical with respect to the center 0. The disk spring 26 is secured to the holder 23 of the element holder 21 by inserting fixing pins 30 into the mounting holes 28 as shown in FIG. 2, and is secured to the upper ends of the support poles 25 of the apparatus body by inserting fixing pins 31 into the mounting holes 29 as shown in FIG. 3.

Thus, the element holder 21 is coupled resiliently, by means of the disk spring 26, with two support poles 25 of the apparatus body through the holder 23. The coupling end face of the optical element 11, which is mounted on the element holder 21, is tiltable against the coupling end face of a coupling part, not shown. The disk spring 26 may be made of metal, such as phosphorus bronze and stainless, or synthetic resin.

The element holder 21 for supporting the optical element 11 is movable in the horizontal direction, and a coupling part 13 coupled with an optical fiber 14 is movable in the vertical direction. As shown in FIG. 5, the two support poles 25 are supported by an X-stage 32 and a Y-stage 33. The X-stage 32 is horizontally movable in the X-direction. The Y-stage 33 is horizontally movable in the Y-direction orthogonal to the X-direction. The coupling part 13, which is located facing the optical element 11, is supported by a support arm 34. The support arm 34 is mounted on an Z-stage 35, which is movable in the Z-direction orthogonal to the X- and Y-directions.

The optical element 11 is positioned and held in a state that it is mounted on the element holder 21. As shown in FIG. 6, a bracket 37 is secured to the left (FIG. 6) end part of the lower side of the holder 23 by means of a bolt 36. An electrode plate 39 is also secured to the bracket 37 by means of a bolt 38. A lead wire, not shown, is connected to the electrode plate 39. A support bracket 41 is secured to the right end part (FIG. 6) of the lower side of the holder 23 by means of a bolt 40. The lower part of the support bracket 41 is Y-shaped into which an operation lever 42 is rotatably coupled by means of a pin 43. A hand grip is formed around the base portion of the operation lever 42. A clamp plate 44 coated with rubber is secured to the fore end of the operation lever 42. The lead pins 12 of the optical element 11 is nipped by the clamp plate (rubber) 44 and the electrode plate 39. The operation lever 42 is kept horizontally while holding the lead pin 12 of the optical element 11 when a metal piece 45 is magnetically attracted to a magnet 46 secured to the holder 23.

The elements aligning/coupling apparatus of the present embodiment is used in the manufacturing stage of light emitting and receiving elements for optical communication. The manufacturing process of an optical link will be described. As shown in FIGS. 7 and 8, semiconductor chips, for example, are bonded to a lead frame 47, thereby to assembly a substrate 48. Then, an E/O (electrooptic) transducing element 49 and an O/E (optoelectric) transducing element 50 are respectively aligned with the coupling parts and coupled with them by welding. Then, those are inspected. Then, as shown in FIG. 8(a), the E/O transducing element 49 is coupled with the substrate 48, and the O/E transducing element 50 is coupled with the substrate. As shown in FIG. 8(b), the resultant assembly is molded by resin, thereby forming a molded product 51. Finally, as shown in FIG. 8(c), a receptacle 52 is attached to the product, and the resultant product is inspected.

How to align and couple the E/O and the O/E transducing elements with coupling parts by using the elements aligning/coupling apparatus of the first embodiment will be described. The aligning and coupling work of an E/O transducing element with a coupling part will first be described. A light emitting element 11 as an optical element is mounted on the element holder 21 by inserting the lead pins 12 of the optical element into the through-holes 22 of the holder (FIGS. 1, 5, and 6). The lead pins 12 of the optical element 11 are nipped by the electrode plate 39 and the clamp plate (rubber) 44 by turning the operation lever 42 to be horizontal. A sleeve 13 with a lens 13a as a coupling part is set to the support arm 34 of the Z-stage 35. Then, the support arm 34 is moved in the Z-direction, so that the sleeve 13 is made to approach to the light emitting element 11, and the end faces of those elements are brought into close contact with each other. In this way, the optical element is aligned with the coupling part.

To be more specific, the sleeve 13 is made to approach to the light emitting element 11 mounted on the element holder 21 (see FIG. 9(a)), whereby the coupling end face of the sleeve 13 is brought into press contact with the coupling end face of the light emitting element 11. Here, the close contact of the end faces of both the elements is secured. In this case, if the parallelism between the coupling end faces of those elements is poor, the exact parallelism will automatically be set up because of the unique construction of the first embodiment. As recalled, the element holder 21 is resiliently supported by the disk spring 26, which is supported by the support poles 25 and the holder 23. Therefore, in this situation where those elements are coupled in a state of poor parallelism between their coupling end faces, the disk spring 26 is deformed with respect to the X line and Y line so that the light emitting element 11 mounted on the element holder 21 comes in close contact with the sleeve 13 in a state of good parallelism of their coupling end faces.

The light emitting element 11 is aligned with the lens 13a in a manner that the optical fiber 14 is inserted into the sleeve 13 from its top and current is fed thereto, and the light emitting element 11 is moved for adjustment in the X-direction and Y-direction (see FIG. 9(b)). After the aligning work, three-spot laser beams are applied to the connection part of the light emitting element 11 and the sleeve 13, thereby to weld there (see FIG. 9(c)). The E/O transducing element, after the diode 11 and the sleeve 13 are aligned and coupled by welding, is removed from the element holder 21 (see FIG. 9(d)). In the case of an O/E transducing element for the optical element, a photo diode (PD), in place of the light emitting diode, is set to the element holder, and is subjected to the same aligning process while light is applied through the optical fiber, and coupled by welding.

Gap between the optical element (light emitting diode) 11 and the coupling part (sleeve) 13 of each of the thus coupled components were measured and graphically represented in a histogram as shown in FIG. 10. As seen, no large gap S was observed. The only gaps S observed were small, with an average value of 4.3 μm. The time of the work of aligning and coupling the optical element with the coupling part was measured for the respective pieces of the work, and plotted into a graph of FIG. 11. As seen from the figure, the times for the respective work pieces were remarkably reduced when comparing with those by the conventional elements aligning/coupling apparatus. The time by the apparatus of the invention was 27.3% of that by the conventional apparatus.

An elements aligning/coupling apparatus according to a second embodiment of the present invention will be described with reference to FIGS. 12 through 16.

Figure 12:
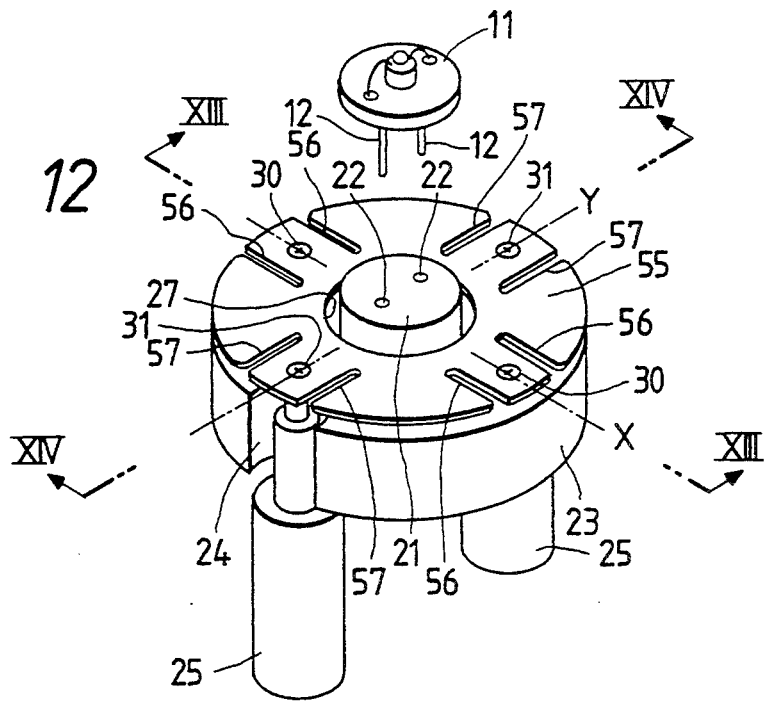
FIG. 12 is a perspective view showing an element holder used in an elements aligning/coupling apparatus according to a second embodiment of the present invention.
Figure 13:
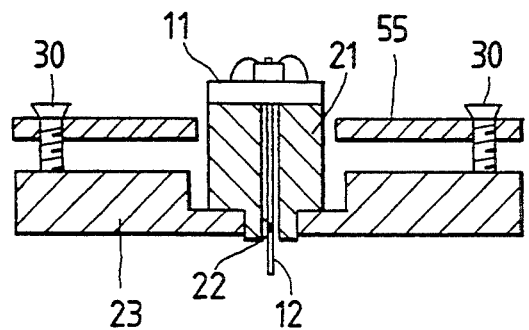
FIG. 13 is a cross sectional view taken on line XIII—XIII in FIG. 12.
Figure 14:
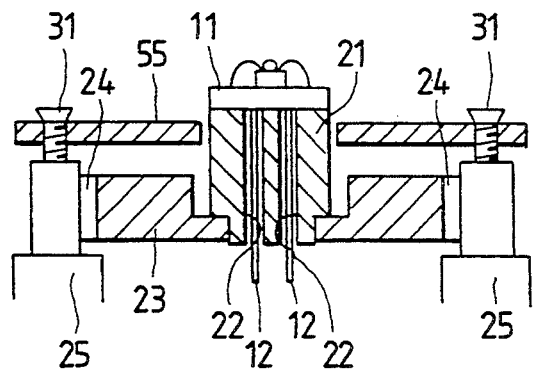
FIG. 14 is a cross sectional view taken on line XIV—XIV in FIG. 12.
Figure 15A:
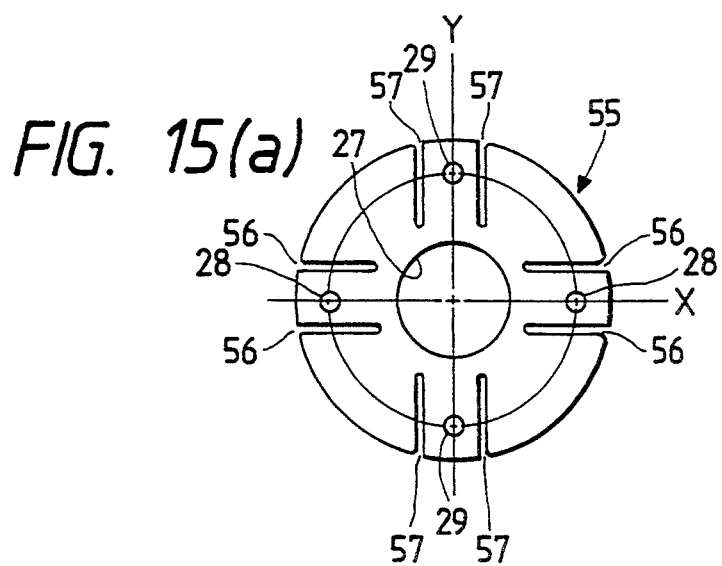
FIG. 15(a) is a plan view showing a disk spring coupled with the element holder of FIG. 12.
Figure 15B:
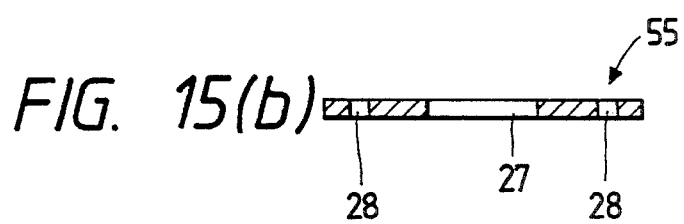
FIG. 15(b) is a cross sectional view showing the disk spring of FIG. 15(a)
Figure 16:
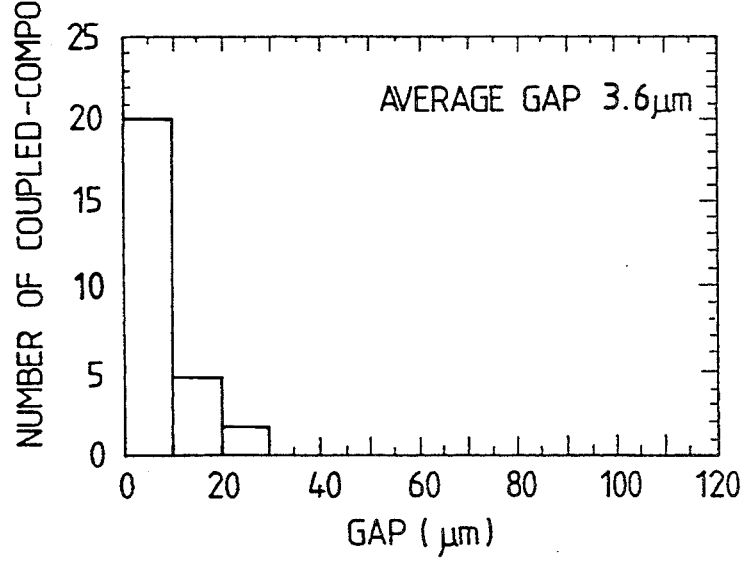
FIG. 16 is a graph showing a histogram in which the relationship between the number of element-part coupled components and their gaps are plotted.

FIG. 12 is a perspective view showing an element holder used in an elements aligning/coupling apparatus according to a second embodiment of the present invention. FIG. 13 is a cross sectional view taken on line XIII—XIII in FIG. 12. FIG. 14 is a cross sectional view taken on line XIV—XIV in FIG. 12. FIG. 15(a) is a plan view showing a disk spring used in the apparatus. FIG. 15(b) is a cross sectional view showing the disk spring of FIG. 15(a). FIG. 16 is a graph showing a histogram in which the relationship between the number of element-part coupled components and their gaps are plotted.

As shown in FIGS. 12 through 14, in the elements aligning/coupling apparatus of the second embodiment, the element holder 21 is resiliently coupled with the support poles 25 by means of a disk spring 55, which intervenes between the element holder 21 and the support poles 25. As shown in FIG. 15, the disk spring 55 has a hole 27 in the central part thereof. A pair of mounting holes 28, formed also in the disk spring 55, are disposed on a first X line extending radially. Another pair of mounting holes 29 are also formed therein being disposed on a second Y line, which extends radially and is substantially orthogonal to the first X line. The disk spring 55 is fastened to the holder 23 of the element holder 21 by inserting fixing pins 30 into the mounting holes 28 as shown in FIG. 13, and is fastened to the upper ends of the support poles 25 of the apparatus body by inserting fixing pins 31 into the mounting holes 29, as shown in FIG. 14.

A pair of slits 56 and 56 are formed on both sides of each of the two fixing points (mounting holes 28 and the fixing pins 30), which lie on the X line. Another pair of slits 57 and 57 are formed on both sides of each of the two fixing points (mounting holes 29 and the fixing pins 31), which lie on the Y line. Thus, the element holder 21 is coupled resiliently, by means of the disk spring 55, with two support poles 25 of the apparatus body through the holder 23. The coupling end face of the optical element 11, which is mounted on the element holder 21, is tiltable against the coupling end face of a coupling part.

To align and couple an optical element 11 with a coupling part, the coupling part is pushed against the optical element 11 held by the element holder 21, thereby to bring the coupling end face of the coupling part into close contact with the coupling end face of the optical element 11. In this case, if the parallelism between the coupling end faces of those elements is poor, the exact parallelism will automatically be set up because of the unique construction of the second embodiment. As recalled, the element holder 21 is resiliently supported by the disk spring 55, which is supported by the support poles 25 and the holder 23. Therefore, in such a situation where those elements are coupled in a state of poor parallelism between their coupling end faces, when the optical element is pressed against the coupling part, the optical element 11 on the element holder 21 is tilted so that the element 11 is brought into close contact with the coupling part over their coupling end faces. Accordingly, the resultant coupled component has no gap between the coupling end faces of them.

It is noted here that the disk spring 55 has the paired slits 56, which are provided on both sides of each of the two fixing points on the X line, and further the paired slits 57 likewise, which are provided on both sides of each of the two fixing points on the Y line. With the paired slits 56 and 57, the disk spring 55 can be deformed with weak force applied thereto for the X and Y lines. Therefore, the element holder 21 more sensitively and flexibly responds to the force applied thereto, so that the optical element 11 mounted thereon is sensitively tilted to come in contact with the coupling part over the entire end faces thereof, without any gap formed therebetween.

Gap between the optical element 11 and the coupling part of each of the thus coupled components were measured and plotted into a histogram as shown in FIG. 16. As seen, no large gap S was not observed. The only gaps S observed were small and had an average value of 3.6 μm.

An elements aligning/coupling apparatus according to a third embodiment of the present invention will be described with reference to FIGS. 17 through 20.

Figure 17:
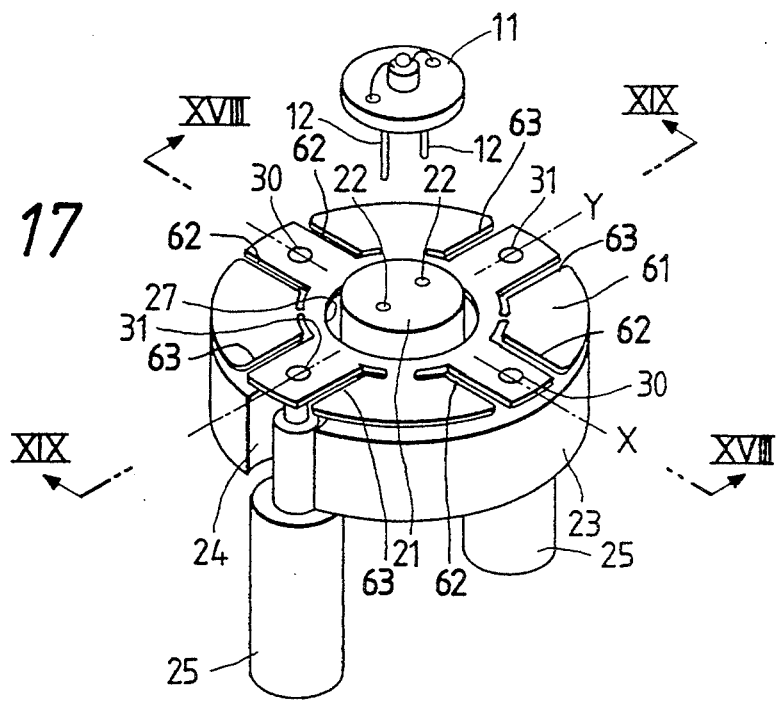
FIG. 17 is a perspective view showing an element holder used in an elements aligning/coupling apparatus according to a third embodiment of the present invention.
Figure 18:
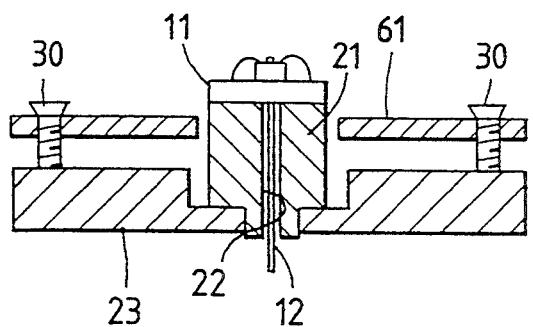
FIG. 18 is a cross sectional view taken on line XVIII—XVIII in FIG. 17.
Figure 19:
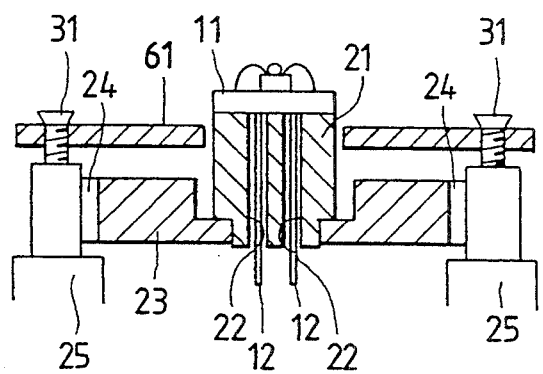
FIG. 19 is a cross sectional view taken on line XIX—XIX in FIG. 17.
Figure 20A:
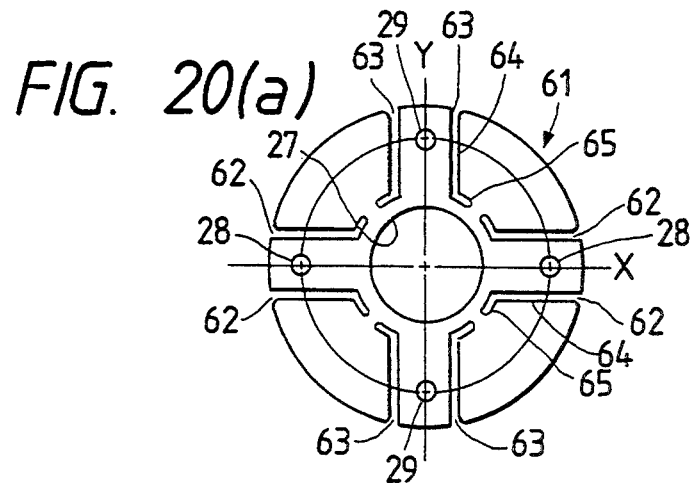
FIG. 20(a) is a plan view showing a disk spring coupled with the element holder of FIG. 17.
Figure 20B:
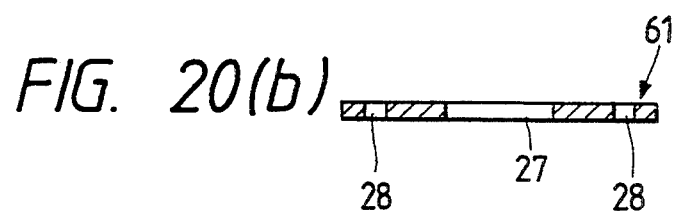
FIG. 20(b) is a cross sectional view showing the disk spring of FIG. 20(a)

FIG. 17 is a perspective view showing an element holder used in an elements aligning/coupling apparatus according to a third embodiment of the present invention. FIG. 18 is a cross sectional view taken on line XVIII—XVIII in FIG. 17. FIG. 19 is a cross sectional view taken on line XIX—XIX in FIG. 17. FIG. 20(a) is a plan view showing a disk spring coupled with the element holder of FIG. 17. FIG. 20(b) is a cross sectional view showing the disk spring of FIG. 20(a).

As shown in FIGS. 17 through 19, in the elements aligning/coupling apparatus of the third embodiment, the element holder 21 is resiliently coupled with the support poles 25 by means of a disk spring 61, which intervenes between the element holder 21 and the support poles 25. As shown in FIG. 20, the disk spring 61 has a hole 27 in the central part thereof. A pair of mounting holes 28, formed also in the disk spring 61, are disposed on a first X line extending radially. Another pair of mounting holes 29 are also formed therein being disposed on a second Y line, which extends radially and is substantially orthogonal to the first X line. The disk spring 61 is fastened to the holder 23 of the element holder 21 by inserting fixing pins 30 into the mounting holes 28 as shown in FIG. 18, and is fastened to the upper ends of the support poles 25 of the apparatus body by inserting fixing pins 31 into the mounting holes 29, as shown in FIG. 19.

A pair of slits 62 and 62 are formed on both sides of each of the two fixing points (mounting holes 28 and the fixing pins 30), which lie on the X line. Another pair of slits 63 and 63 are formed on both sides of each of the two fixing points (mounting holes 29 and the fixing pins 31), which lie on the Y line. Each of the paired slits 62 and 63 includes a linear part 64 and an arc part 65. The linear parts 64 of the paired slits 62 (63), located on both sides of each fixing point (mounting hole 28 (29) and fixing pin 30 (31)), are parallel to each other. The arc parts 65 of the paired slits 62 (63) extend along the circumference of the hole 27 but in the directions opposite to each other. Thus, the element holder 21 is coupled resiliently, by means of the disk spring 61, with two support poles 25 of the apparatus body through the holder 23. The coupling end face of the optical element 11, which is mounted on the element holder 21, is tiltable against the coupling end face of a coupling part.

To align and couple an optical element 11 with a coupling part, the coupling part is pushed against the optical element 11 held by the element holder 21, thereby to bring the coupling end face of the coupling part into close contact with the coupling end face of the optical element 11. In this case, if the parallelism between the coupling end faces of those elements is poor, the exact parallelism will automatically be set up because of the unique construction of the third embodiment. As recalled, the element holder 21 is resiliently supported by the disk spring 61, which is supported by the support poles 25 and the holder 23. Therefore, in such a situation where those elements are coupled in a state of poor parallelism between their coupling end faces, when the optical element is pressed against the coupling part, the optical element 11 on the element holder 21 is tilted so that the element 11 is brought into close contact with the coupling part over their coupling end faces. Accordingly, the resultant coupled component has no gap between the coupling end faces of them.

It is noted here that the disk spring 61 has the paired slits 62 and 63, which are provided on both sides of each of the two fixing points on the X line, and further the paired slits 63 likewise, which are provided on both sides of each of the two fixing points on the Y line, and each of those slits includes the linear part 64 and arc part 65. With the paired slits 62 and 63 thus shaped, the disk spring 61 is tiltable in any direction. The disk spring 61, when receiving an external force, is deformed with short distance from the fulcrum. Therefore, it can be deformed with weak force applied thereto for the X and Y lines. The element holder 21 more sensitively and flexibly responds to the force applied thereto, so that the optical element 11 mounted thereon is sensitively tilted to come in contact with the coupling part over the entire end faces thereof, without any gap formed therebetween.

Gap between the optical element 11 and the coupling part of each of the thus coupled components were measured. The measurement results showed no large gap S was not observed. Gaps S observed were small and their average value was 3.2 μm.

Figure 21:
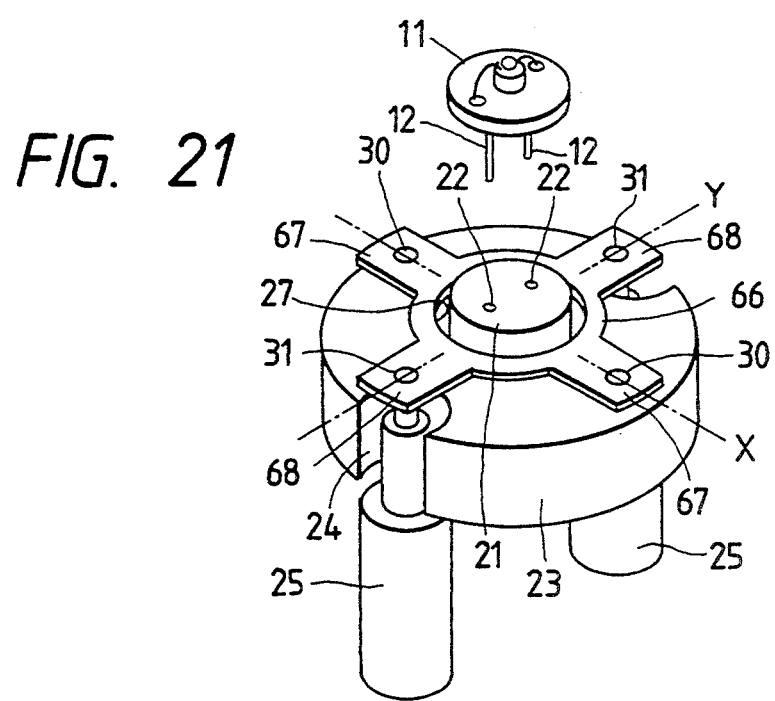
FIG. 21 is a perspective view showing an element holder used in an elements aligning/coupling apparatus according to a fourth embodiment of the present invention.

FIG. 21 is a perspective view showing an element holder used in an elements aligning/coupling apparatus according to a fourth embodiment of the present invention.

As shown in FIG. 21, in the elements aligning/coupling apparatus of the fourth embodiment, the element holder 21 is resiliently coupled with the support poles 25 by means of a disk spring 66, which intervenes between the element holder 21 and the support poles 25. As shown, the disk spring 66 has a hole 27 in the central part thereof. Two couples of support members 67 and 68, disposed orthogonal to each other, extend radially and outwardly from a ring-like disk spring 66 located around the upper part of the element holder 21. The spring 66 is fastened to the holder 23 by means of fixing pins 30 at two fixing points on the first X line and further to the top ends of the support poles 25 of the apparatus by means of additional fixing pins 31 at two additional fixing points on the second Y line. Accordingly, the element holder 21 is resiliently connected, by means of the spring 66, to the two support poles 25 of the apparatus through the holder 23. The optical element 11 set to the element holder 21 is tiltable against the coupling end face of the coupling part.

To align and couple an optical element 11 with a coupling part, the coupling part is pushed against the optical element 11 held by the element holder 21, thereby to bring the coupling end face of the coupling part into close contact with the coupling end face of the optical element 11. In this case, if the parallelism between the coupling end faces of those elements is poor, the exact parallelism will automatically be set up because of the unique construction of the fourth embodiment. As recalled, the element holder 21 is resiliently supported by the spring 66, which is supported by the support poles 25 and the holder 23. Therefore, in such a situation where those elements are coupled in a state of poor parallelism between their coupling end faces, when the optical element is pressed against the coupling part, the optical element 11 on the element holder 21 is tilted so that the element 11 is brought into close contact with the coupling part over their coupling end faces. Accordingly, the resultant coupled component has no gap between the coupling end faces of them.

Figure 22:
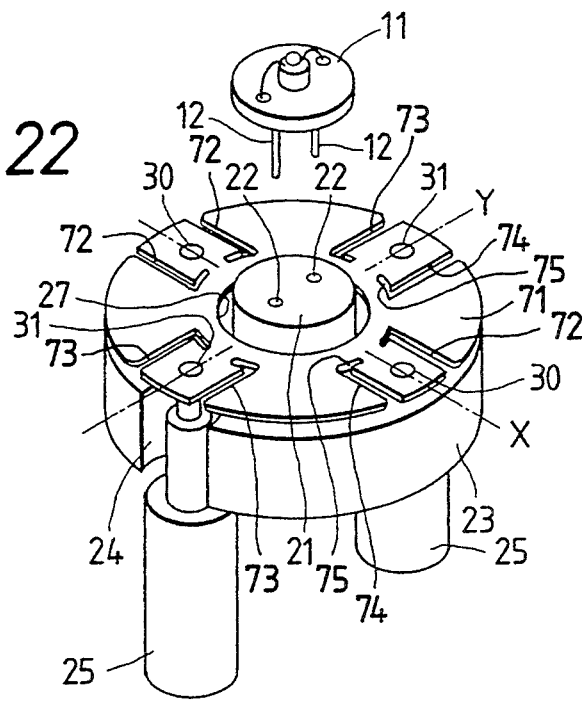
FIG. 22 is a perspective view showing an element holder used in an elements aligning/coupling apparatus according to a fifth embodiment of the present invention.

FIG. 22 is a perspective view showing an element holder used in an elements aligning/coupling apparatus according to a fifth embodiment of the present invention.

As shown in FIG. 22, in the elements aligning/coupling apparatus of the third embodiment, the element holder 21 is resiliently coupled with the support poles 25 by means of a disk spring 71, which intervenes between the element holder 21 and the support poles 25. As shown, the disk spring 71 has a hole 27 in the central part thereof. The disk spring 71 has a couple of mounting holes 28 formed therein and disposed on a first X line that radially extends, and another couple of mounting holes 29 disposed on a second Y line that is radially extends and is orthogonal to the first X line. The spring 71 is fastened to the holder 23 of the element holder 21 by inserting fixing pins 30 into the mounting holes 28, and further to the top ends of the support poles 25 of the apparatus by inserting additional fixing pins 31 into the mounting holes 29.

A pair of slits 72 and 72, extending from the circumferential edge of the spring 71 toward the inner side of the spring, are formed on both sides of each of the two fixing points (mounting holes 28 and the fixing pins 30), which lie on the X line. Another pair of slits 73 and 73, extending from the circumferential edge of the spring 71 toward the inner side of the spring, are formed on both sides of each of the two fixing points (mounting holes 29 and the fixing pins 31), which lie on the Y line. Each of the paired slits 72 and 73 includes a linear part 74 and an arc part 75. The linear parts 74 of the paired slits 72 (73), located on both sides of each fixing point (mounting hole 28 (29) and fixing pin 30 (31)), are parallel to each other. The arc parts 75 of the paired slits 72 (73) extend along the circumference of the hole 27 but in the directions opposite to each other. Thus, the element holder 21 is coupled resiliently, by means of the disk spring 71, with two support poles 25 of the apparatus body through the holder 23. The coupling end face of the optical element 11, which is mounted on the element holder 21, is tiltable against the coupling end face of a coupling part.

To align and couple an optical element 11 with a coupling part, the coupling part is pushed against the optical element 11 held by the element holder 21, thereby to bring the coupling end face of the coupling part into close contact with the coupling end face of the optical element 11. In this case, if the parallelism between the coupling end faces of those elements is poor, the exact parallelism will automatically be set up because of the unique construction of the fourth embodiment. As recalled, the element holder 21 is resiliently supported by the spring 71, which is supported by the support poles 25 and the holder 23. Therefore, in such a situation where those elements are coupled in a state of poor parallelism between their coupling end faces, when the optical element is pressed against the coupling part, the optical element 11 on the element holder 21 is tilted so that the element 11 is brought into close contact with the coupling part over their coupling end faces. Accordingly, the resultant coupled component has no gap between the coupling end faces of them with the paired slits 72 and 73 each having the linear part 74 and the arc part 75, the disk spring 71, when receiving an external force, is deformable in any direction with weak force applied thereto. Accordingly, the optical element 11 can be brought into close contact with the coupling part without any gap therebetween.

Figure 23:
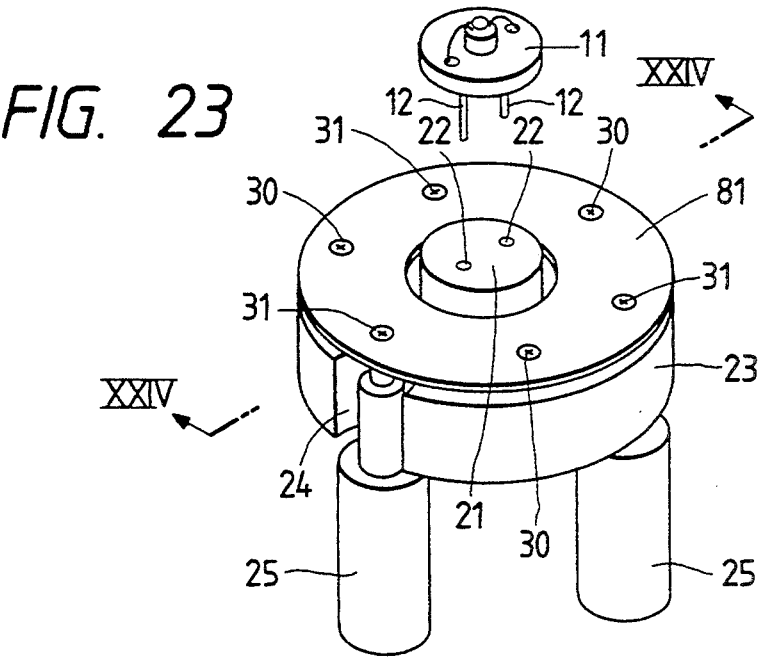
FIG. 23 is a perspective view showing an element holder used in an elements aligning/coupling apparatus according to a sixth embodiment of the present invention.
Figure 24:
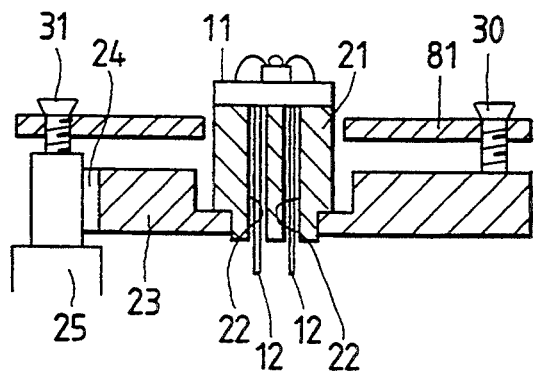
FIG. 24 is a cross sectional view taken on line XXIV—XXIV in FIG. 23.
Figure 25A:
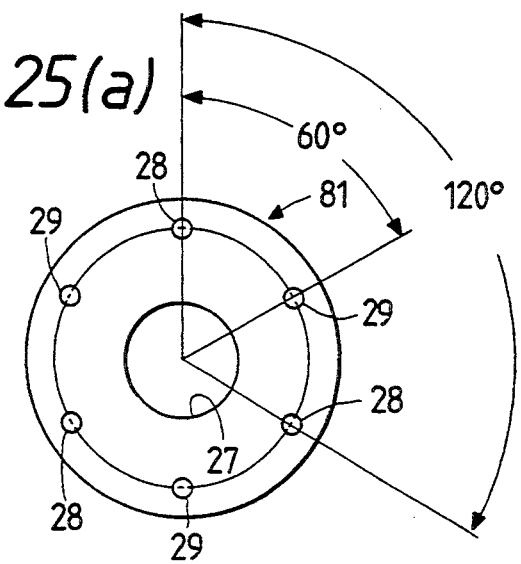
FIG. 25(a) is a plan view showing a disk spring coupled with the element holder of FIG. 23.
Figure 25B:
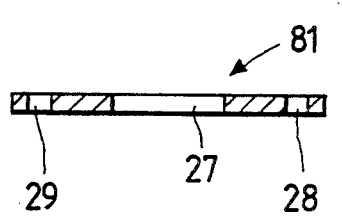
FIG. 25(b) is a cross sectional view showing the disk spring of FIG. 25(a)

FIG. 23 is a perspective view showing an element holder used in an elements aligning/coupling apparatus according to a sixth embodiment of the present invention. FIG. 24 is a cross sectional view taken on line XXIV—XXIV in FIG. 23. FIG. 25(a) is a plan view showing a disk spring coupled with the element holder of FIG. 23. FIG. 25(b) is a cross sectional view showing the disk spring of FIG. 25(a).

As shown in FIGS. 23 and 24, in the elements aligning/coupling apparatus of the sixth embodiment, the element holder 21 is resiliently coupled with the support poles 25 by means of a disk spring 81, which intervenes between the element holder 21 and the support poles 25. As shown, the disk spring 81 has a hole 27 in the central part thereof. Three mounting holes 28, formed in the disk spring 81, are disposed equidistantly on the disk spring as viewed in the circumferential direction. Additional three mounting holes 29 each located between the adjacent mounting holes 28 are disposed equidistantly on the disk spring as viewed in the circumferential direction. The spring 81, as shown in FIG. 24, is fastened to the holder 23 of the element holder 21 by inserting fixing pins 30 into the mounting holes 28, and further to the top ends of the support poles 25 of the apparatus by inserting additional fixing pins 31 into the mounting holes 29.

Thus, the element holder 21 is coupled resiliently, by means of the disk spring 81, with three support poles 25 of the apparatus body through the holder 23. The coupling end face of the optical element 11, which is mounted on the element holder 21, is tiltable against the coupling end face of a coupling part.

To align and couple an optical element 11 with a coupling part, the coupling part is pushed against the optical element 11 held by the element holder 21, thereby to bring the coupling end face of the coupling part into close contact with the coupling end face of the optical element 11. In this case, if the parallelism between the coupling end faces of those elements is poor, the exact parallelism will automatically be set up because of the unique construction of the sixth embodiment. As recalled, the element holder 21 is resiliently supported by the spring 81, which is supported by the support poles 25 and the holder 23. Therefore, in such a situation where those elements are coupled in a state of poor parallelism between their coupling end faces, when the optical element is pressed against the coupling part, the optical element 11 on the element holder 21 is deformed on the fulcrums of the fixing points (fixing pins 30 and 31) to be tilted against the coupling end face of the coupling part. Since the disk spring 81, when receiving an external force, is deformable in any direction, the optical element 11 can be brought into close contact with the coupling part without any gap therebetween.

Gap between the optical element 11 and the coupling part of each of the thus coupled components were measured. The measurement results showed that no large gap S was not observed. Gaps S observed were small and their average value was 2.8 $\mu$m.

In the sixth embodiment as described above, the resilient member is the metal disk spring, but it may take any other suitable shape and be made of any other suitable material. The positions and the number of the fixing points of the spring to the holder or the support poles may be selected properly.

As described above, in the elements aligning/coupling apparatus of the sixth embodiment, a plate-like resilient member is disposed around an optical element held by an element holder. A plurality of first coupling portions of the resilient member are secured to the element holder. A plurality of second coupling portions of the resilient member are secured to the apparatus body. Even in such a situation where an optical element and a coupling part are coupled in a state of poor parallelism between their coupling end faces, when the optical element is pressed against the coupling part, the optical element on the element holder is tilted against the coupling end face of the coupling part, so that the optical element can be brought into close contact with the coupling part without any gap therebetween. Therefore, the aligning and coupling work of the optical element with the coupling part is improved in efficiency.

Further, in the elements aligning/coupling apparatus, the resilient member is a disk spring. The disk spring is fastened to the element holder at two points thereof that lie on the first line that radially extends, and further to the apparatus body at two points thereof that lie on the second line. Slits are formed in the disk spring in such a fashion that each slit radially extending is located between the fixing points, and the inner side of each sleeve extends along the inner circumference thereof. The disk spring, when receiving an external force, is deformed with short distance from the fulcrum. Therefore, it can be deformed with weak force applied thereto. The optical element is flexibly tiltable against the coupling part.

A seventh embodiment of the present invention will be described with reference to FIGS. 26 to 28.

Figure 26:
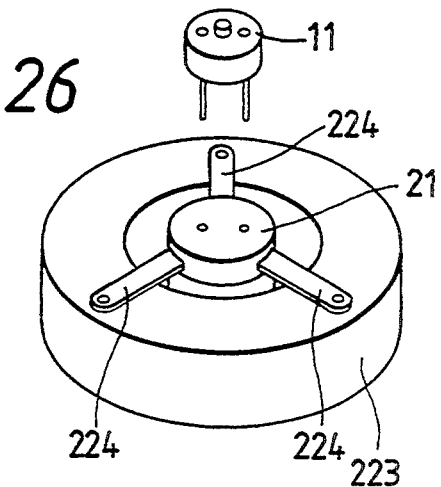
FIG. 26 is a perspective view showing an element holder used in an elements aligning/coupling apparatus according to a seventh embodiment of the present invention.
Figure 27:
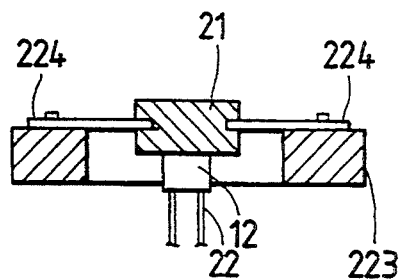
FIG. 27 is a longitudinal sectional view of the elements aligning/coupling apparatus of FIG. 26.

FIG. 26 is a perspective view showing an element holder used in an elements aligning/coupling apparatus according to a seventh embodiment of the present invention. FIG. 27 is a cross sectional view of a key portion of the embodiment. FIG. 28 is a graph showing a histogram in which the relationship between the number of element-part coupled components and their gaps are plotted.

In the elements aligning/coupling apparatus of the seventh embodiment, an element holder 21, shaped like a disk, is provided with a socket 12 with lead wires 22.

An optical element 11 may be mounted on the top side of the element holder 21. When the optical element 11 is mounted on the element holder 21, the lead wires 11 come in electrical contact with the lead pins of the optical element 11. A ring-like holder 223 resiliently supports the element holder 21 by means of a plurality of (three in this instance) plate springs 224 radially disposed. In other words, the element holder 21 is disposed in the central part of the ring-like holder 223, and coupled with the holder 223 by means of the three plate springs 224. Therefore, the optical element 11 mounted on the element holder 21 is tiltable against the coupling end face of a coupling part, not shown. The plate springs 224 may be made of metal, such as phosphorus bronze and stainless, or synthetic resin.

To align and couple an optical element 11 with a coupling part, the coupling end faces of the coupling part and the optical element 11 are brought into close contact with each other. In this case, if the parallelism between the coupling end faces of those elements is poor, the exact parallelism will automatically be set up because of the unique construction of the seventh embodiment. As recalled, the element holder 21 is resiliently supported by the ring-like holder 223 by means of the plate springs 224. Therefore, even in such a situation where those elements are coupled in a state of poor parallelism between their coupling end faces, when those elements are made to press contact with each other, the optical element 11 mounted on the element holder 21 is tilted against the coupling end face of the coupling part. Accordingly, the resultant coupled component has no gap between the coupling end faces of them.

Figure 28:
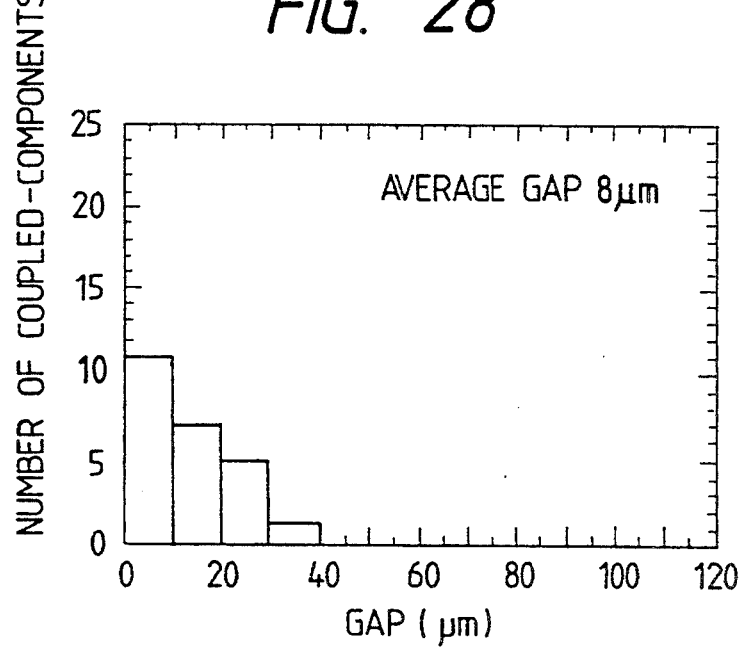
FIG. 28 is a graph showing a histogram in which the relationship between the number of element-part coupled components and their gaps are plotted.

Gap between the optical element 11 and the coupling part of each of the thus coupled components were measured and plotted into a histogram as shown in FIG. 28. As seen, no large gap S was not observed. Gaps S observed were small and their average value was 8.0 μm.

As described above, in the elements aligning/coupling apparatus of the seventh embodiment, the element holder is resiliently supported by the ring-like holder by means of the plate springs radially extending from the outer circumference of the element holder. Therefore, even in such a situation where those elements are coupled in a state of poor parallelism between their coupling end faces, when those elements are made to press contact with each other, the optical element mounted on the element holder is tilted against the coupling end face of the coupling part. Accordingly, the resultant coupled component has no gap between the coupling end faces of them. An efficient aligning/work can be realized.

An eight embodiment of the present invention will be described with reference to FIGS. 29 through 32.

Figure 29:
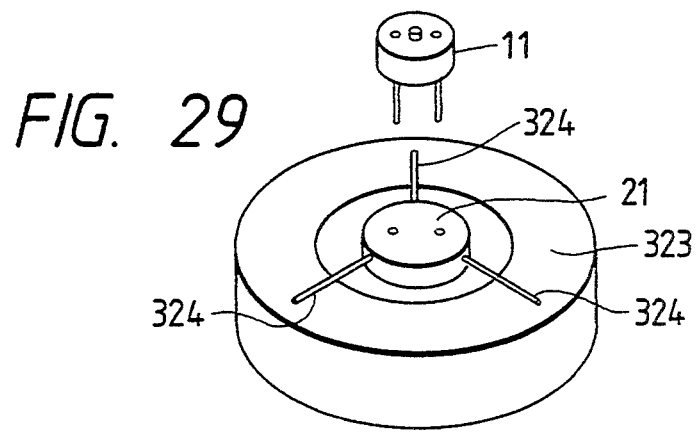
FIG. 29 is a perspective view showing an element holder used in an elements aligning/coupling apparatus according to an eighth embodiment of the present invention.
Figure 30:
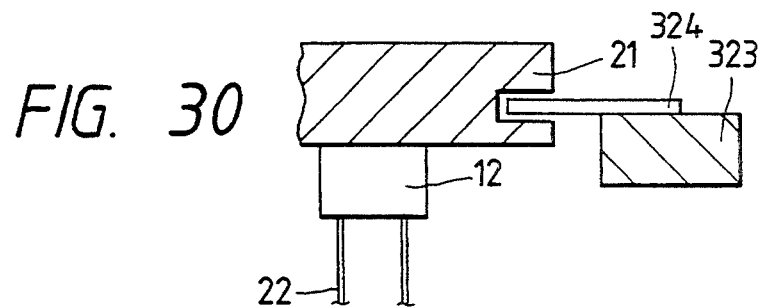
FIG. 30 is a longitudinal sectional view of the elements aligning/coupling apparatus of FIG. 29.
Figure 31:
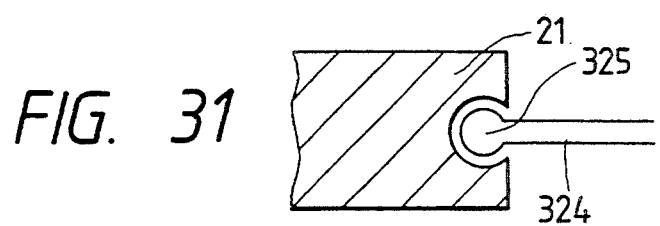
FIG. 31 is a cross sectional view showing a support structure with a different support pin.
Figure 32:
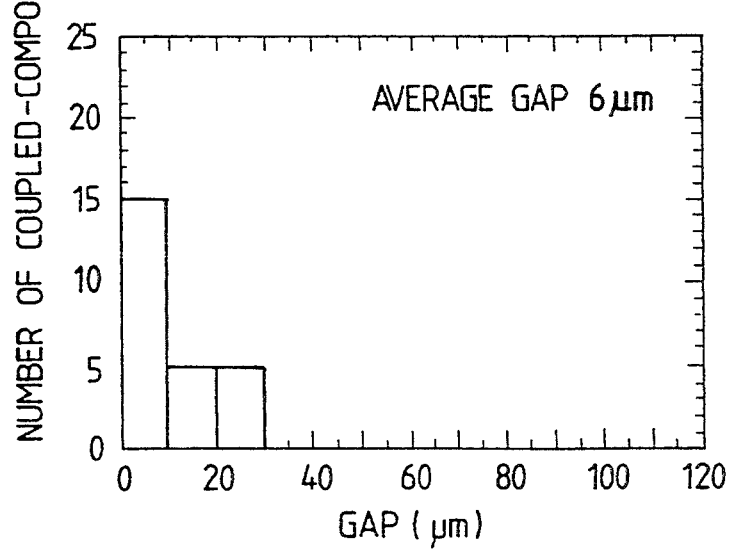
FIG. 32 is a graph showing a histogram in which the relationship between the number of element-part coupled components and their gaps are plotted.
Figure 33:
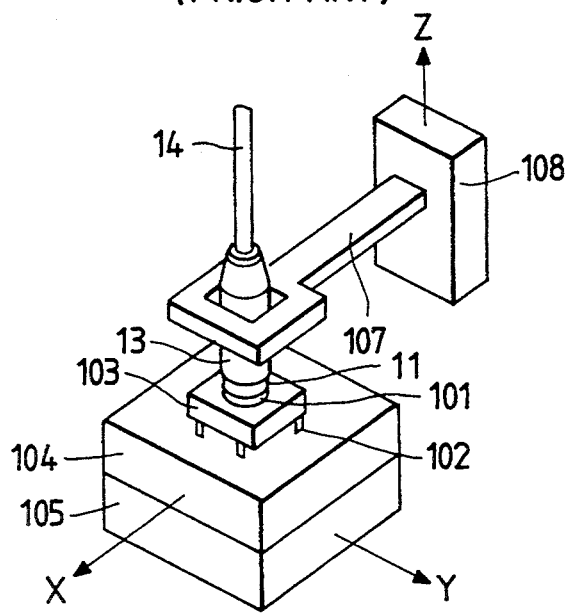
FIG. 33 is a perspective view showing a conventional element holder used in an elements aligning/coupling apparatus.
Figure 34:
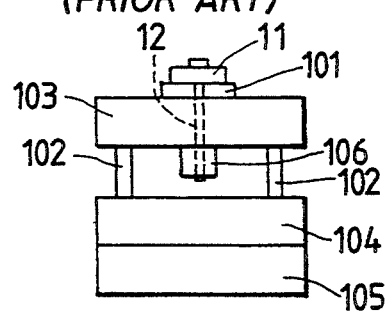
FIG. 34 is a side view showing the elements aligning/coupling apparatus of FIG. 33.
Figure 38:
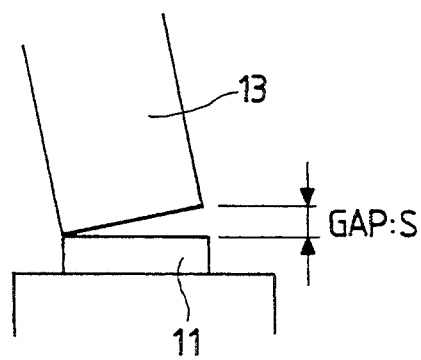
FIG. 38 is a side view showing a gap produced in an element-part coupled component.
Figure 39:
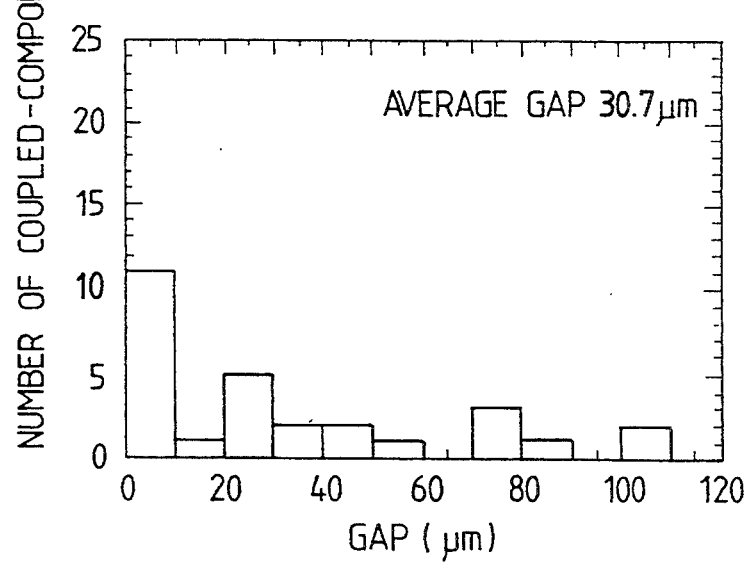
FIG. 39 is a graph showing a histogram in which the relationship between the number of element-part coupled components and their gaps are plotted.
Figure 35:
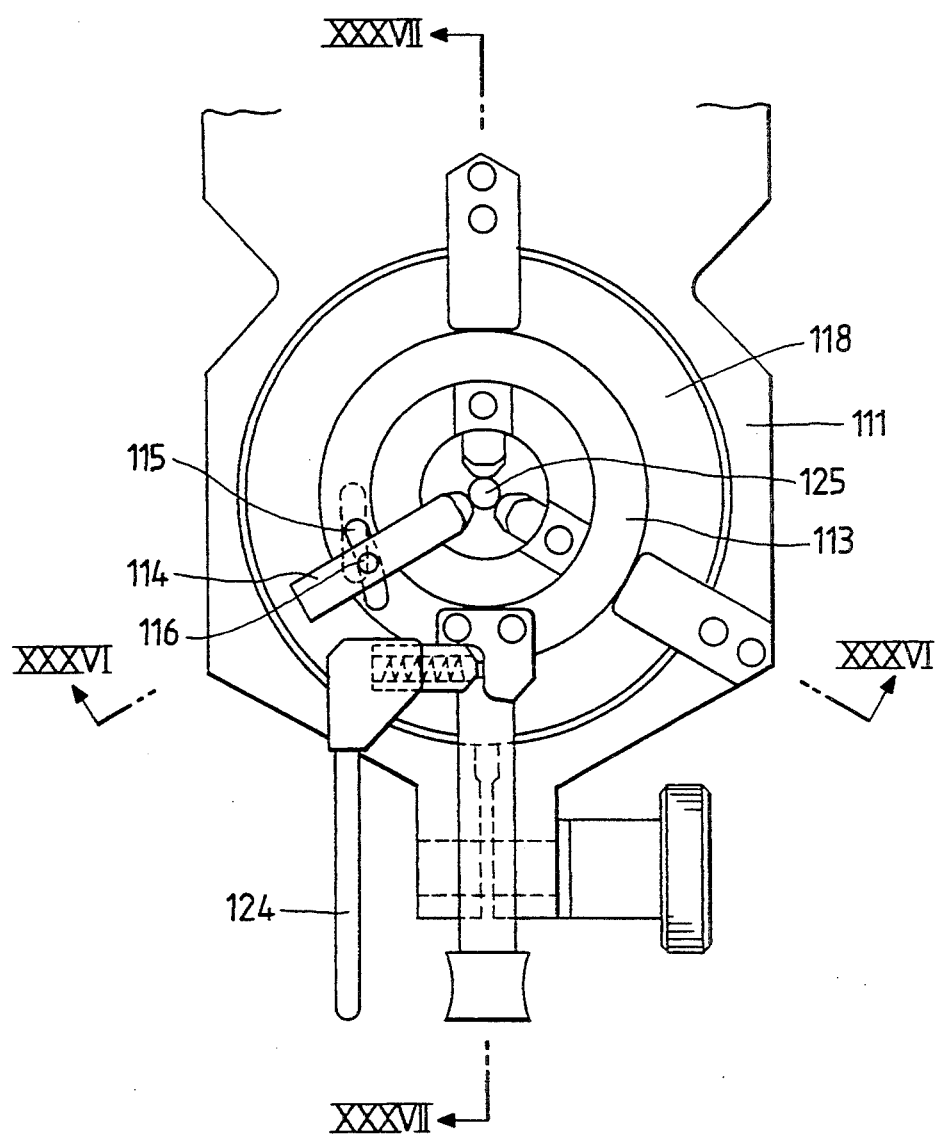
FIG. 35 is a plan view showing another conventional elements aligning/coupling apparatus.
Figure 36:
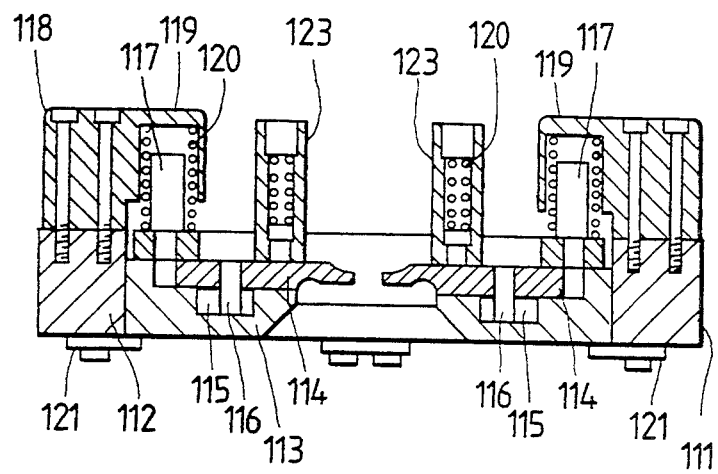
FIG. 36 is a cross sectional view taken on line XXXVI—XXXVI in FIG. 35.
Figure 37:
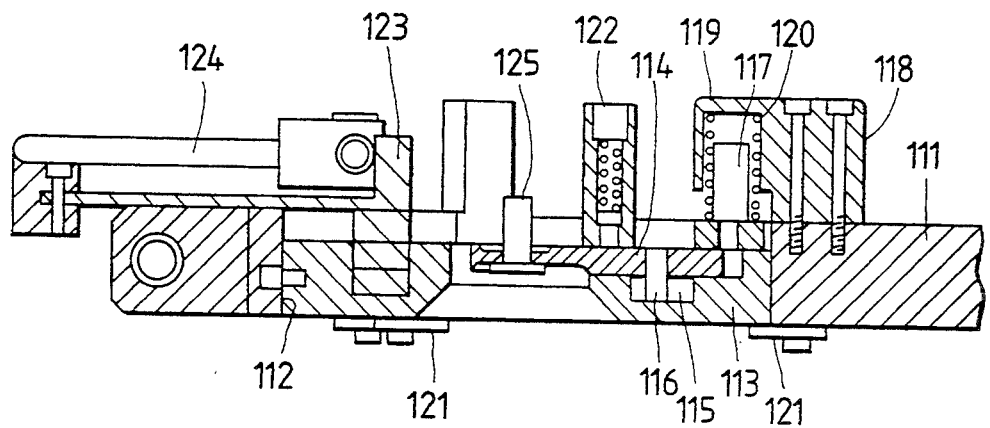
FIG. 37 is a cross sectional view taken on line XXXVII—XXXVII in FIG. 35.

FIG. 29 is a perspective view showing an element holder used in an elements aligning/coupling apparatus according to a seventh embodiment of the present invention. FIG. 30 is a cross sectional view of a key portion of the embodiment. FIG. 31 is a cross sectional view showing a support structure with a different support pin. FIG. 32 is a graph showing a histogram in which the relationship between the number of element-part coupled components and their gaps are plotted.

In the elements aligning/coupling apparatus of the eighth embodiment, an element holder 21, shaped like a disk, is provided with a socket 12 with lead wires 22. An optical element 11 may be mounted on the top side of the element holder 21. When the optical element 11 is mounted on the element holder 21, the lead wires 11 come in electrical contact with the lead pins of the optical element 11. A ring-like holder 323 resiliently supports the element holder 21 by means of a plurality of (three in this instance) support pins 324 (like bars) radially disposed. In other words, the element holder 21 is disposed in the central part of the ring-like holder 323, and coupled with the holder 323 by means of the three support pins 324. The support pins are each circular in cross section, and are resilient. Therefore, the optical element 11 mounted on the element holder 21 is tiltable against the coupling end face of a coupling part, no shown.

To align and couple an optical element 11 with a coupling part, the coupling end faces of the coupling part and the optical element 11 are brought into close contact with each other. In this case, if the parallelism between the coupling end faces of those elements is poor, the exact parallelism will automatically be set up because of the unique construction of the seventh embodiment. As recalled, the element holder 21 is resiliently supported by the ring-like holder 323 by means of the support pins 324. Therefore, even in such a situation where those elements are coupled in a state of poor parallelism between their coupling end faces, when those elements are made to press contact with each other, the optical element 11 mounted on the element holder 21 is tilted against the coupling end face of the coupling part. Accordingly, the resultant coupled component has no gap between the coupling end faces of them.

It is evident that the coupling structure of the support pins 324 with the element holder 21 is not limited to the structure as mentioned above. A pole joint 325 as shown in FIG. 31 may be used for the coupling of them. With use of the pole joint, the element holder 21 is smoothly operable when the coupling end face of the optical element 11 is brought into close contact with the coupling end face of the coupling part.

Gap between the optical element 11 and the coupling part of each of the thus coupled components were measured and plotted into a histogram as shown in FIG. 32. As seen, no large gap S was not observed. Gaps S observed were small and its average value was 6.0 μm.

As described above, in the elements aligning/coupling apparatus of the eighth embodiment, the element holder is resiliently supported by the ring-like holder by means of the bar-like members radially extending from the outer circumference of the element holder. Therefore, even in such a situation where those elements are coupled in a state of poor parallelism between their coupling end faces, when those elements are made to press contact with each other, the optical element mounted on the element holder is tilted against the coupling end face of the coupling part. Accordingly, the resultant coupled component has no gap between the coupling end faces of them. An efficient aligning-/work can be realized.

What is claimed is:

1. An apparatus for aligning and coupling optical elements comprising:
   a first body movable in a first direction and holding a coupling part;
   a second body which is movable relative to said first body in a plane orthogonal to said first direction;
   first means, mounted on said first body, for bringing said coupling part into contact with one of said optical elements, said one of said optical elements being held by an element holder; and second means, mounted on said second body, for tiltably and resiliently supporting said element holder in such a manner that said one of said optical elements held by said element holder is adaptively tilted without external adjustment when placed into contact with said coupling part so as to minimize a gap between said coupling part and said one of said optical elements.

2. An apparatus according to claim 1, in which said tiltably and resiliently supporting means is fastened to said element holder at at least two first fixing points and is further fastened to said second body at at least two second fixing points.

3. An apparatus according to claim 2, in which the tiltably and resiliently supporting means is a disk spring, said disk spring being fastened to said element holder at said two first fixing points which lie on a circle coaxial with the disk spring and on a first line that radially extends therefrom, and said disk spring being fastened to said second body at said two second fixing points which lie on a circle coaxial with the disk spring and on a second line that radially extends therefrom.

4. The apparatus according to claim 3, in which slits are formed in the disk spring in such a fashion that each slit radially extends between said fixing points.

5. The apparatus according to claim 4, in which each of said slits extends from an outer side of the spring toward an inner side thereof, and an inner side of each slit extends along the inner circumference thereof.

6. The apparatus according to claim 2, in which said tiltably and resiliently supporting means is a disk spring, wherein three first fixing points are formed at such positions of the disk spring so as to be substantially equidistantly separated as viewed in the circumferential direction and lie on a circle coaxial with the disk spring, and three second fixing points are formed at such positions of the disk spring so as to be substantially equidistantly separated as viewed in the circumferential direction and lie on a circle coaxial with the disk spring, the second fixing points each being located between the adjacent two first fixing points.

7. An apparatus according to claim 2, in which said tiltably and resiliently supporting means is plate springs radially extending from an outer circumference of said element holder.

8. An apparatus according to claim 2, in which said tiltably and resiliently supporting means is bar-like members radially extending from an outer circumference of said element holder.

* * * * *